Feb. 6, 1962  H. H. ALBINSON ETAL  3,019,671
TRANSMISSION
Original Filed May 31, 1955  7 Sheets-Sheet 1

Feb. 6, 1962 H. H. ALBINSON ETAL 3,019,671
TRANSMISSION
Original Filed May 31, 1955 7 Sheets-Sheet 2

INVENTORS
Harold H. Albinson &
Joseph F. Voss
BY T. L. Chisholm
ATTORNEY

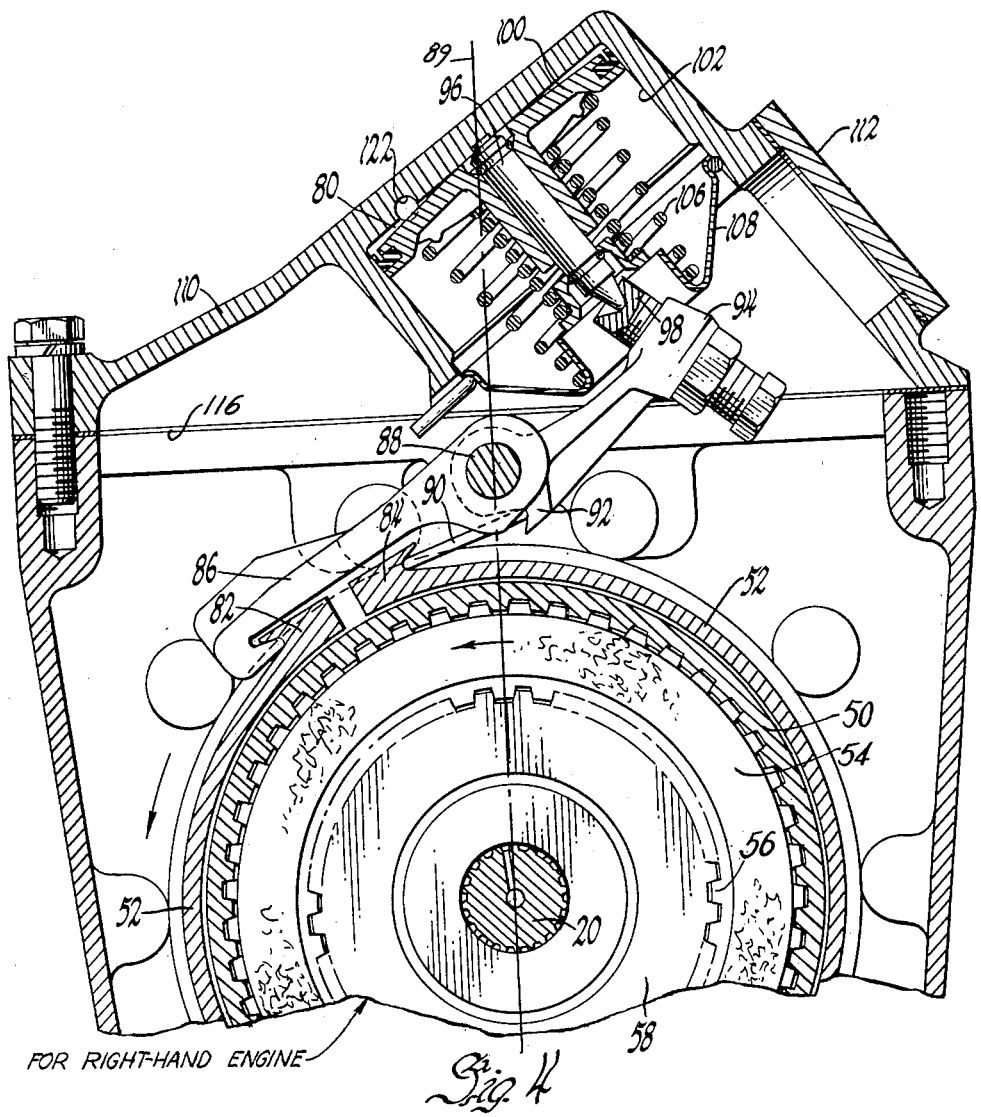

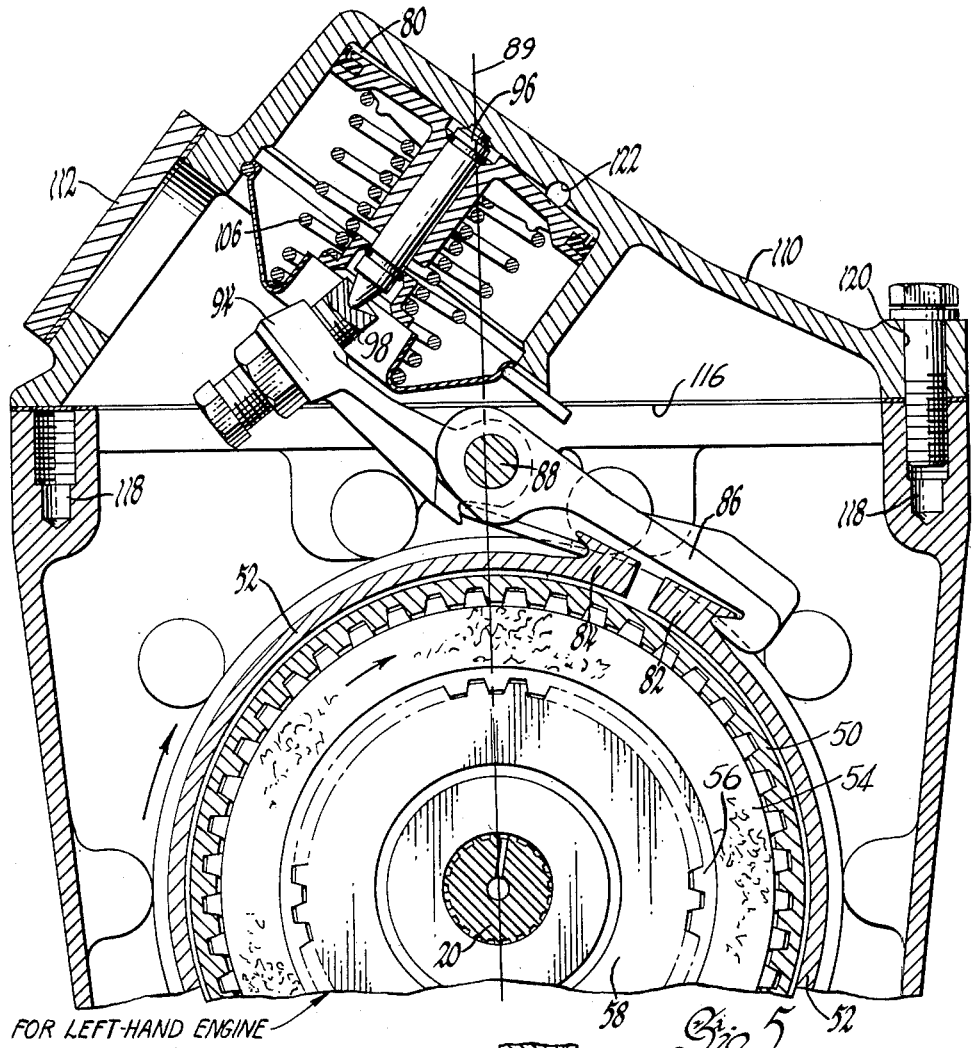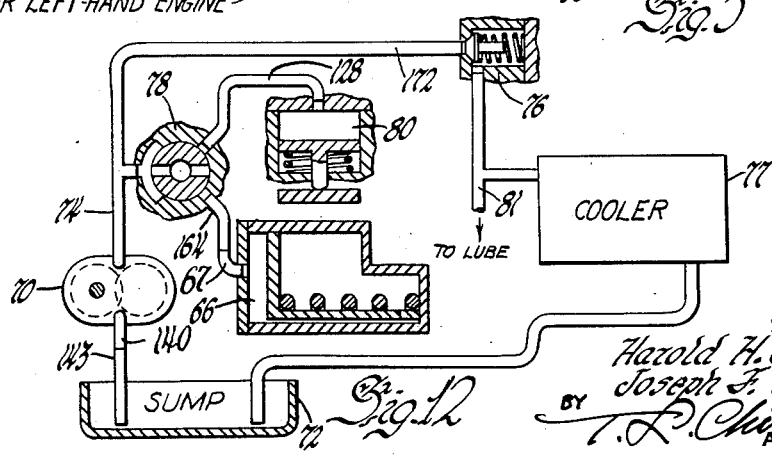

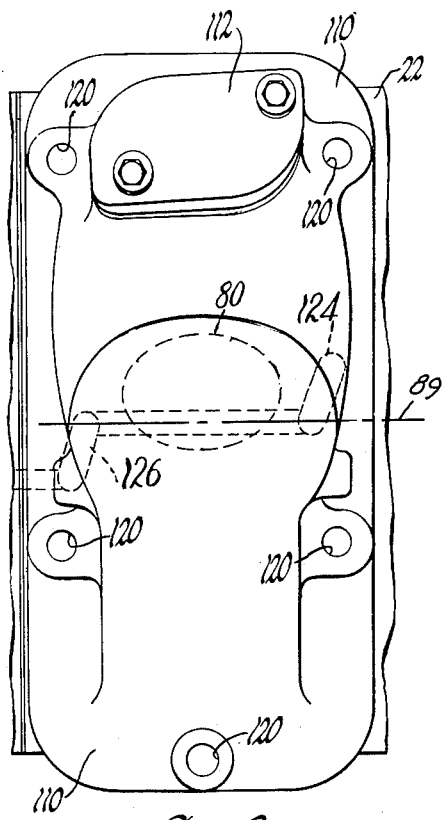
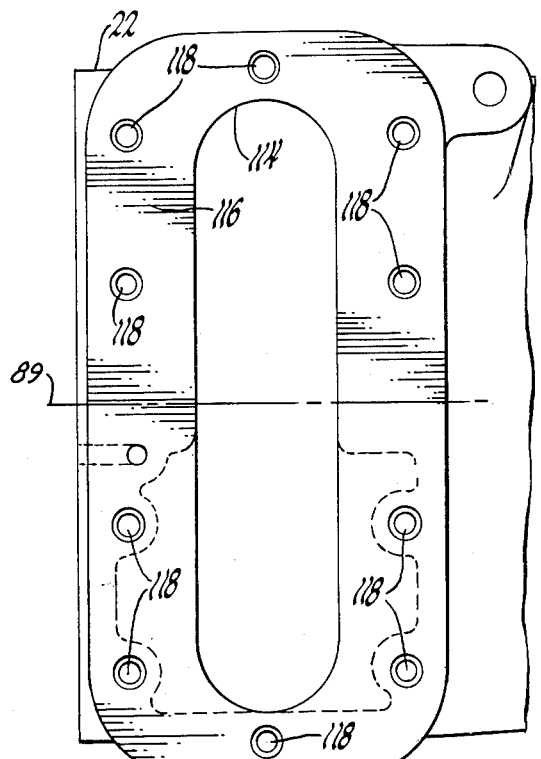

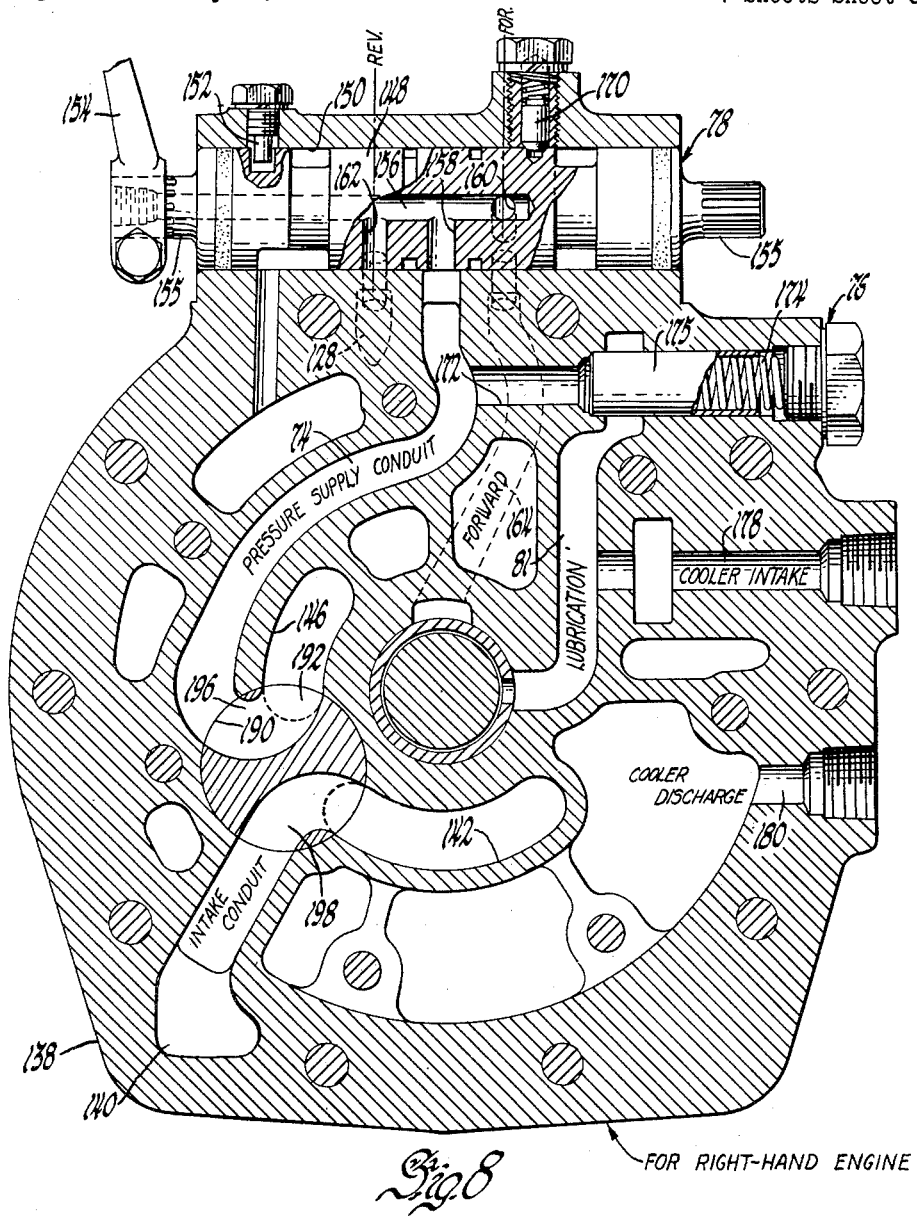

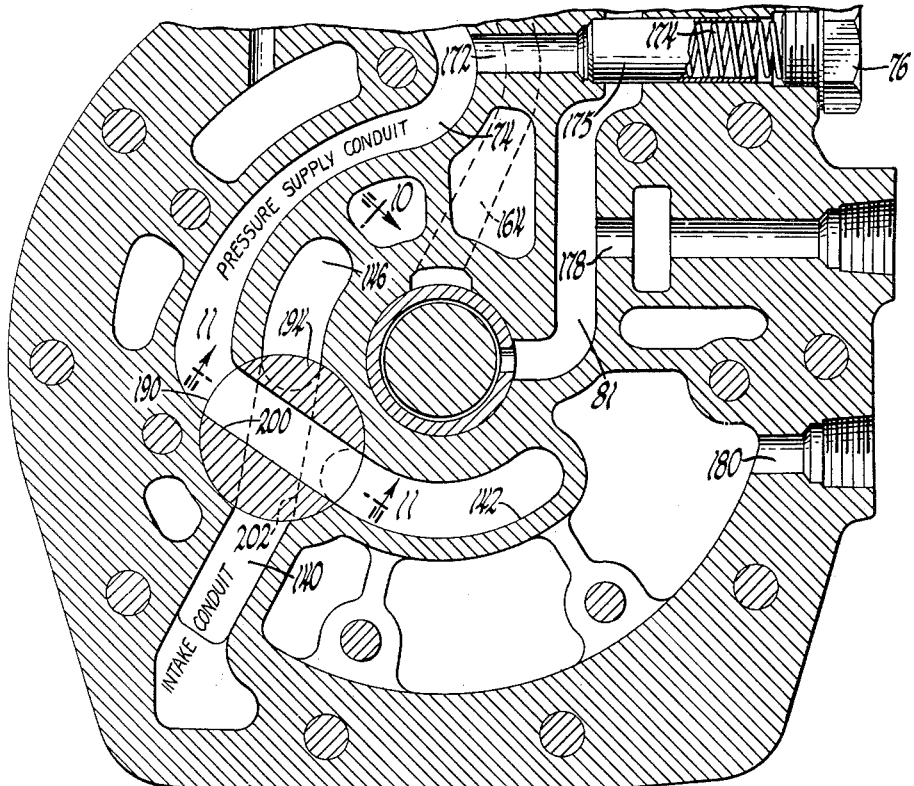
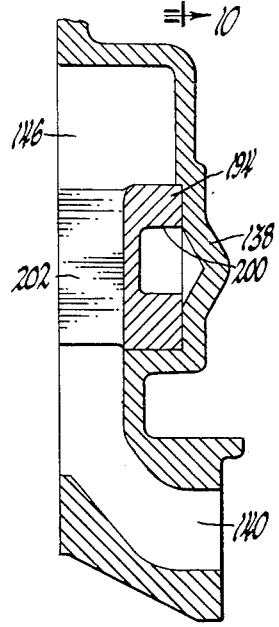
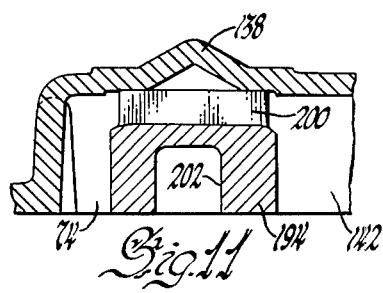

United States Patent Office 3,019,671
Patented Feb. 6, 1962

3,019,671
TRANSMISSION
Harold H. Albinson, Detroit, and Joseph F. Voss, Plymouth, Mich., assignors to General Motors Corporation, Detroit, Mich., a corporation of Delaware
Original application May 31, 1955, Ser. No. 512,222. Divided and this application June 12, 1958, Ser. No. 741,591
7 Claims. (Cl. 74—758)

This is a division of our application Serial No. 512,222 titled Transmission and filed May 31, 1955 and now Patent No. 2,867,136.

This invention relates to power transmissions and particularly to those adapted to provide forward and reverse drive of a power output shaft from a prime mover such as an internal combustion engine. It is particularly suitable for marine drives, with or without reduction gearing, and will be described as applied to such drives, but only as an example.

Many marine drives, especially for small boats, as a practical matter require an internal combustion engine for a power plant, a propeller which must be turned slower than it is practical for the engine to run, and a power transmission to provide forward and reverse drive, as well as neutral. Engines of either right or left hand rotation are used, and when two engines and two propellers are used it is customary to have oppositely rotating engines.

One of the objects of our invention is to provide a simple, economical improved transmission especially suitable for such marine drives. It is particularly desired to provide a transmission which can be assembled from existing and readily available parts with a minimum of special construction, and which can be readily adapted for right or left hand engines. It is also an object to provide a simple and reliable hydraulic control system for such transmissions.

Figure 1:
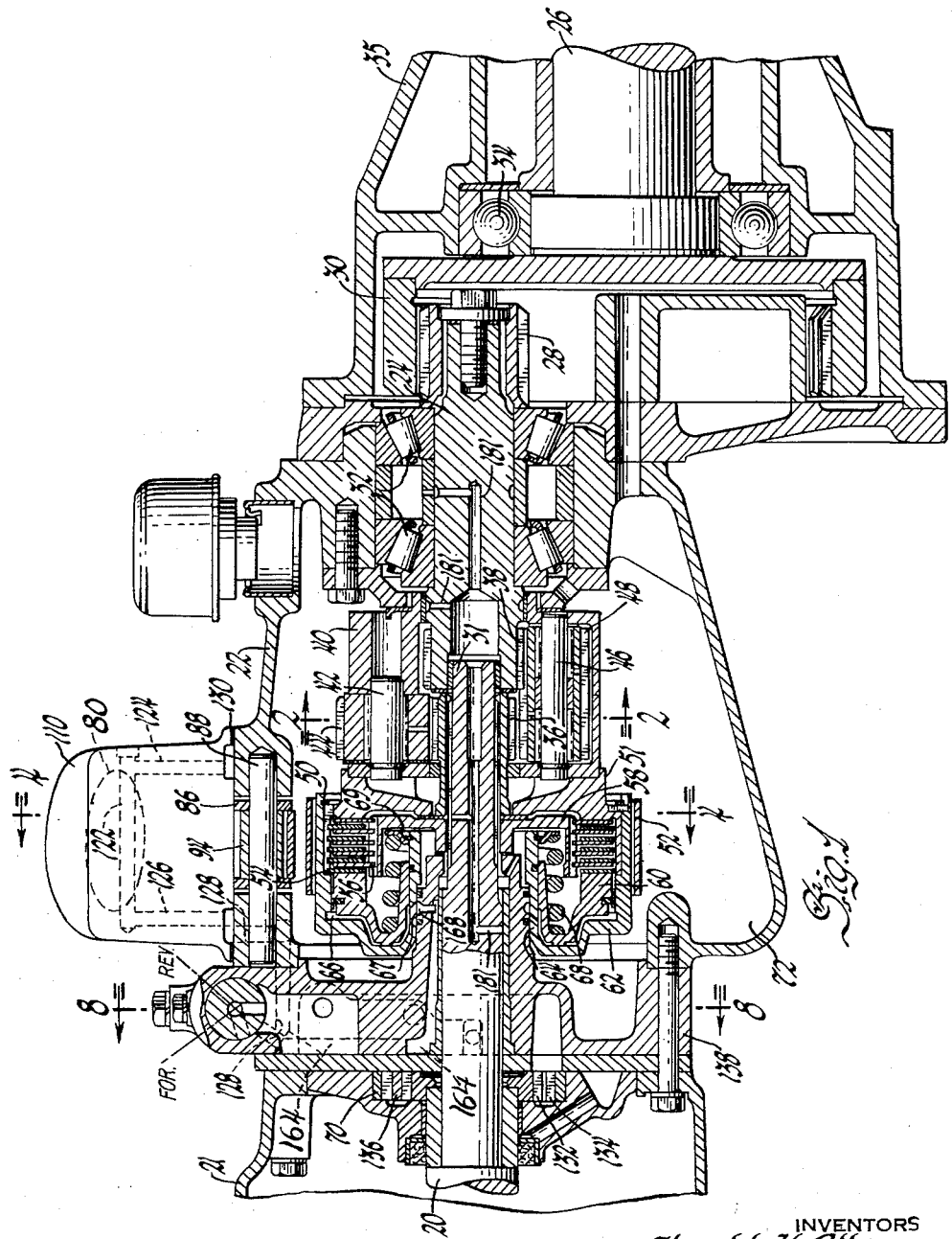
Figure 2:
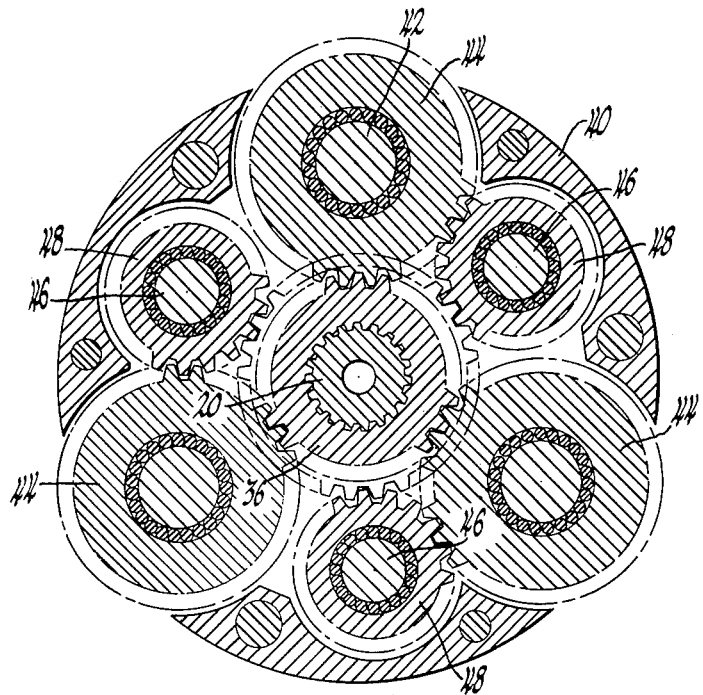
Figure 3:
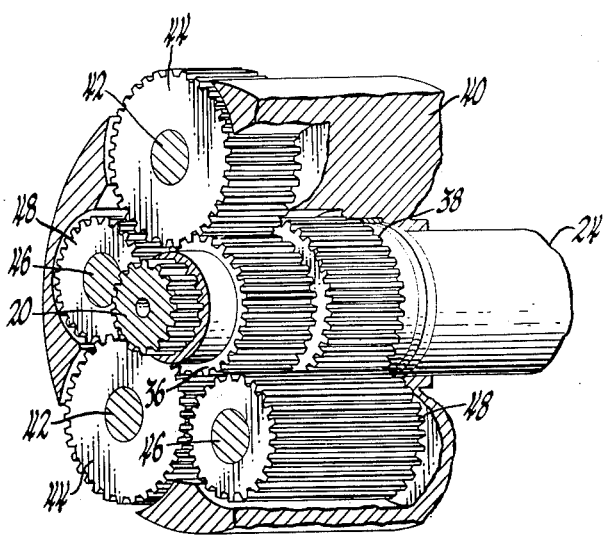

These and other objects and advantages of our invention will be apparent from the following description, and from the drawings in which FIGURE 1 is a vertical longitudinal section through a transmission embodying one form of the invention, FIGURE 2 is a section on the line 2—2 of FIG. 1 showing part of the forward and reverse planetary gearing, FIGURE 3 is a diagrammatic perspective view, partly broken away, of the gearing shown in FIGS. 1 and 2, FIGURE 4 is a partial section on the line 4—4 of FIG. 1 showing a drive-establishing mechanism arranged for a right-hand engine, FIGURE 5 is a section corresponding to FIG. 4 of the same parts arranged for a left-hand engine, FIGURE 6 is a plan view of a portion of the transmission casing, FIGURE 7 is a plan view of the portion of the transmission casing shown in FIG. 6 but with the brake operating mechanism removed, FIGURE 8 is a section on the line 8—8 of FIG. 1 showing a valve plate and its hydraulic control passages in a transmission for a right-hand engine, FIGURE 9 is a part section corresponding to FIG. 8 of a valve plate for a transmission for a left hand engine, FIGURE 10 is a section on the line 10—10 of FIG. 9, FIG. 11 is a section on the line 11—11 of FIG. 9, and FIG. 12 is a diagram of one form of control system.

In FIGURE 1 an engine shaft 20 extends from an engine casing, or first casing 21 into a transmission case or second casing 22 where it is connected through gearing, to be described, with a transmission output shaft 24 which may be connected to a propeller shaft 26 in any suitable manner, for example through a reduction gear including a pinion 28 keyed to the shaft 24 and engaging an internal gear 30 keyed to the propeller shaft 26. The transmission output shaft 24 has a bore for a bearing 31 for the reduced end of the input shaft, and is itself supported in any suitable radial and thrust bearings 32 mounted in the case 22. Likewise, the propeller shaft 26 may be mounted in any suitable radial and thrust bearing 34 in the reduction gear casing 35.

In order to drive the transmission output shaft either forward or backward, as desired, we provide planetary forward and reverse gearing which includes an input sun gear 36 splined to the engine shaft 20, an output sun gear 38 integral with the transmission output shaft, and a carrier 40 having spindles 42 on which are mounted short planetary pinions 44 meshing with the input sun gear 36 and also having spindles 46 carrying long planetary pinions 48 which mesh with the short pinions 44 and with the output sun gear 38 but not with the input sun gear 36. When the carrier 40 is held stationary, rotation of the engine shaft 20 (for example clockwise as FIG. 2 is viewed) rotates the short pinions 44 in the opposite sense, which rotates the long pinions 48 clockwise and these long pinions rotate the output sun gear 38 counterclockwise to drive the propeller shaft 26 in reverse. In order to hold the carrier 40 to provide this reverse drive a brake drum 50 is splined to the carrier and may be held stationary by a drive-establishing device in the form of a reverse brake 52 (FIG. 4) which can be operated by mechanism to be described.

For forward drive the planetary gear set is locked up to rotate as a solid coupling. This is accomplished by connecting the carrier 40 to the engine shaft 20 by a direct drive establishing device in the form of a clutch including drive plates 54 splined to the brake drum 50 (and through it connected to the carrier) and driving plates 56 splined to a clutch hub 58 keyed to the engine shaft 20. The clutch plates may be pressed together by a piston 60 in a cylinder formed by a flange 62 and sleeve 64 integral with the brake drum 50 and enclosing a pressure chamber 66 to which fluid under pressure can be admitted by passages 67 in the sleeve 64. When fluid under pressure is supplied to the chamber by the control apparatus to be described the piston 60 is urged to the right, as FIG. 1 is viewed, to engage the clutch. When pressure is released the clutch is disengaged by the release spring 68 which bears against a spring abutment 69 fixed to the sleeve 64.

The drive-establishing devices are actuated by oil under pressure supplied by a pump 70 in the first casing 21 and driven by the engine shaft, which pump draws oil from a sump 72 formed in the second casing 22 and diagrammatically shown in FIG. 12. Referring to FIG. 12, whenever the engine is running the pump 70 constantly delivers oil to an oil pressure supply conduit 74 in which pressure is maintained at a constant value by a relief valve 76 which opens under excess pressure to pass oil to a cooler 77 and to lubrication ducts 81. Oil from the cooler and the lubrication ducts returns to the sump 72. A manually operated selector valve 78 directs oil under pressure from the pressure supply conduit 74 either to the clutch chamber 66 for forward drive, or a chamber 80 which operates the reverse brake, or the valve prevents oil from going to either chamber, establishing neutral.

The invention includes novel features of construction and arrangement of the control passages, selector and relief valves, and of the reverse brake operating mechanism which facilitate the adaptation of the transmission to either right or left hand engines.

Referring to FIGS. 1 and 4 the brake band 52 has an anchor lug 82 at one end, and an actuator lug at the other end. The anchor lug engages the hooked end of an anchor 86 pivoted on a fixed pin 88 disposed with its longitudinal axis in a plane of symmetry of the brake drum 50, preferably the central vertical longitudinal plane of the transmission. The trace of this plane in FIGS. 4, 5 is dot-dash line 89. The actuator lug 84 is moved to brake-engaging position by one end of strut 90, the other end of which engages a shoulder 92 on a brake actuator arm 94 also pivoted on the pin 88. When the actuator 94 is rotated clockwise about the pin 88, as FIG. 4 is seen, the strut 90 contracts the brake to apply it to the drum, as is known. The brake arm 94 is actuated when it is desired to apply the brake by an expansible chamber motor or servo including a push rod 96 urged against an adjustable stop 98 in the arm 94 by a piston 100 rigidly connected to the rod 96 and slidable in a cylinder 102 when oil under pressure is admitted to the chamber 80 in the cylinder. When oil is not supplied to the chamber 80 the piston is urged to the position shown in FIG. 4 by a return spring 106 acting against an abutment 108. When the piston is in the position shown in FIG. 4 the brake is released by the inherent resilience of the brake band 52 which expands to urge the brake arm 94 through the strut 90 to follow the piston rod 96. The servo is mounted in a support 110 preferably formed as a housing or cover, which may conveniently be a casting; having a removable cap 112 to give access to the adjustable stop 98.

It will be observed in FIG. 4 that when the brake drum 52 is rotating counterclockwise as shown by the arrow, the brake is self-energizing because the brake drum rotates in such a direction as to tend to drag the apply end at actuator lug 84 toward the anchor end at lug 82. If the brake drum should rotate in the opposite sense it would tend to rotate the entire brake band away from the anchor 86 and this would require undesirably increased pressure in the chamber 104 to set or hold the brake.

In order to accommodate the structure shown in FIG. 4 to both right and left-hand engines, for example in a boat having two propellers rotating in opposite senses, we arrange the brake structure and its operating servo as shown in FIGS. 1, 4 and 5. Because the pin 88 is mounted so that its longitudinal axis is in a plane of symmetry of the brake drum 50, and because of the particular formation of the brake operating parts, the brake band 52, anchor 86, brake arm 94 can be reversed on the pin 88 with respect to the position shown in FIG. 4 to provide the arrangement shown in FIG. 5, which is a self-energizing brake for a drum rotating clockwise, as shown by the arrow in FIG. 5. Likewise, the brake servo support 110 can be symmetrically reversed so that the pin 96 engages the stop 98 in the position of FIG. 5.

To accomplish symmetrical reversibility of the brake servo the transmission case 22 is formed with an opening 114 in its top, as shown in FIG. 7, and this opening is surrounded by a seat 116 perpendicular to the central vertical longitudinal plane of the case. The seat is provided with a plurality of blind tapped bolt holes 118 which are symmetrically arranged with respect to the central vertical longitudinal plane of the transmission. The servo support 110 is provided with a number of bolt holes 120, as shown in FIG. 6. These bolt holes need not be symmetrically arranged but are so placed that when the support 110 is either in the position of FIG. 4 or of FIG. 5 there will be a case hole 118 in register with every support hole 120.

Oil is supplied to the brake operating chamber 80 by a conduit 122 formed in the cover or casing 110 and intersecting the cavity which forms the chamber 80. This conduit is connected to two conduits 124 and 126 in the side walls of the cover 110, as shown in FIG. 1, so that in either position of the cover (as in FIGS. 4 or 5) one or the other conduit 124 or 126 connects with a reverse conduit 128 in the body of the main casing 22. For example, in FIG. 1 the conduit 126 connects with the conduit 128 and the conduit 124 is closed by the gasket 130.

The pump 70 may be of any suitable known form but we prefer to use a crescent-type external-internal gear pump, as shown in the Scheiter Patent 2,671,359. This is mounted in a portion of the engine casing which forms a pump casing and includes an external gear 132 keyed to the engine shaft 20 and meshing with an internal gear 134, leaving crescent-shaped pumping space between the gears in which is placed a crescent-shaped partition 136 dividing the pumping space into intake and pressure delivery chambers as is known in the art. The hand or direction of rotation of the pump determines which chamber is intake and which is delivery.

Between the pump casing 21 and main transmission case 22 is an intermediate or third casing in the form of a valve plate 138 which contains the selector valve 78, the pressure regulating valve 76 and passages for conducting the oil between the pump 70 and the various parts of the control system. As shown in FIG. 8 the valve plate 138 has an intake passage 140. This is connected to a space 142 which connects with that space between the gears and crescent of the pump 70 which is the intake chamber when the pump is on a right hand engine. The intake passage 140 is connected to the sump by the intake conduit 143 shown in FIG. 12. The valve plate 138 also contains the pressure supply conduit 74 which is the oil pressure supply space of the system and is connected to a space 146 which in turn is connected to that space between the gears and crescent in the pump 70 which acts as a discharge chamber when the pump is on a right hand engine.

The pressure supply passage 74 leads to the selector valve 78 as shown in FIGS. 8 and 12. This valve includes a rotatable valve element 148 in a bore 150 in the upper portion of the valve plate 138. The valve element is retained in the bore by a lock pin 152 projecting through the casing into a groove in the valve element which permits rotation of the valve element by a handle 154 which may be secured to either of two shafts 155 on the ends of the valve element. The valve has a central bore 156 connected with a radial intake passage 158 constantly connected to the pressure supply conduit 74 of the pump, a second radial passage 160 for conducting forward oil from the central bore to the forward drive clutch at times, and a third radial passage 162 for conducting reverse oil from the central bore to the reverse brake at times. When the valve body is in the position shown in FIGS. 1 and 8 both the forward passage 160 and the reverse passage 162 are blocked by the bore 150.

When the valve handle 154 is rotated forward, that is counterclockwise as FIG. 1 is seen the forward passage 160 becomes aligned with a forward passage 164 in the valve plate which leads to a gland or groove 168 in a sleeve portion of the valve plate 138 which is disposed within the clutch sleeve 64 and has sealing contact therewith. This supplies forward oil to the clutch operating chamber 66 through passage 67 in the sleeve 64. When the handle is rotated backward the valve body is rotated clockwise from its central position, as FIG. 1 is seen, and the reverse passage 162 is aligned with the reverse passage 128 to conduct reverse oil to the reverse brake chamber 80. A spring poppet 170 may hold the selector valve 148 in the selected forward, neutral or reverse position.

The relief valve generally designated 76 in FIG. 12 is connected to the main supply passage 74 by a branch passage 172. Whenever the pressure in the conduit 74 exceeds a value determined by a spring 174 the valve body 175 moves off its seat to bypass oil to the lubricating passage 81 which is also connected to the cooler intake passage 178. The cooler discharges by-passage 180 to the sump and the lubrication passage 81 supplies oil to all moving parts of the transmission through various ducts such as 181 in FIG. 1, all of which eventually discharge to the sump. The spring 174 of the relief valve and the capacity of the pump 70 are so related that the spring assures the maintenance of sufficient pressure to operate the brake and clutch. Even with the engine idling the pump provides excess capacity which assures opening of the relief valve and consequent supply of oil to the lubricating passages.

Oil pumps of the character described ordinarily pump liquid under pressure only when rotating in one sense because when they are reversed the former delivery chamber becomes the intake chamber. In order to use a pump of this character on an engine rotating in either hand we provide means in the valve plate 138 to interchange the connections of the pump intake and delivery chambers. It will be noted in FIG. 8 that the passages 74 and 146 constituting the pump discharge conduit are formed into a loop which passes very close to a similar loop formed by the passages 140 and 142 which together constitute the intake conduit. We form a bore 190 in the valve plate and we provide two alternative fourth casings 192, shown in FIG. 8, and 194 shown in FIG. 9, either of which can be inserted in the third casing or valve plate. When the fourth casing 192 is used, as in FIG. 8, a passage 196 connects the passage 74 and 146 and a second passage 198 connects passages 140 and 142. When the transmission is to be used with an engine of the opposite hand, the valve plate 138 is assembled with the fourth casing passage 194, in FIG. 9, in which case a passage 200 connects former intake passage 142 which is now the pressure delivery passage of the pump with pressure supply conduit 74 so that the pump discharges from passage 142 into line 74. A passage 202 connects intake passage 140 in the valve plate with former discharge passage 146 of the pump. This interchange of connections between intake and discharge passages permits the same pump to be used with engines rotating in either hand.

We claim:

1. A power transmission comprising in combination, a casing containing a power input shaft, a power output shaft, drive gearing adapted to connect the shafts, a brake drum fixed to an element of the gearing and concentric with the shafts, a brake band for holding the drum against rotation to establish a driving connection through the gearing, the brake band having anchor and apply ends, a brake shaft the axis of which is disposed in a plane of symmetry of the gearing, an anchor pivoted on the shaft and having a free end projecting on one side of said plane of symmetry and supporting the anchor end of the brake, and a brake apply mechanism supporting the apply end of the brake and including a brake arm pivoted on the brake shaft and extending on the other side of said plane of symmetry, the brake band, anchor and apply mechanism being reversible as a unit with respect to the plane of symmetry to provide a self-energizing brake for either hand of rotation of the brake drum; means for operating the brake arm disposed asymmetrically with respect to said plane of symmetry; a support for the operating means formed on the casing and symmetrical with respect to the plane of symmetry; and means for securing the operating means to the support in either of two positions each of which is asymmetrical with respect to said plane, the operating means when in either position being placed to operate the brake apply means in one of its two positions.

2. A power transmission comprising in combination, a casing containing a power input shaft, a power output shaft, drive gearing adapted to connect the shafts, a brake drum fixed to an element of the gearing and concentric with the shafts, a brake band for holding the drum against rotation to establish a driving connection through the gearing, a shaft for supporting a brake actuating member and a brake actuating member on the shaft, the axis of the shaft being in a plane of symmetry of the gearing, the brake and brake actuating member being reversible with respect to said plane of symmetry to provide a self-energizing brake for either hand of rotation of the brake drum; an opening in the casing surrounded by a support symmetrically arranged with respect to said plane of symmetry and substantially perpendicular thereto; a motor member; and means for supporting the motor member in either of two positions on said support which are symmetrical with respect to said plane, one of said members projecting through said opening into the path of the other member when said brake and motor member are in corresponding positions for operating said brake actuating member from the motor member in either of the positions of said motor member on said support.

3. A power transmission comprising in combination a casing containing an input shaft, an output shaft, drive gearing adapted to connect the shafts, and a drive-establishing brake for the gearing, said casing having an opening surrounded by a support located symmetrically with respect to a plane of symmetry of the gearing and having a first surface substantially perpendicular to the plane of symmetry, the brake being reversible with respect to the plane of symmetry to provide a self-energizing brake in either hand of rotation of the gearing; a motor support having a second surface adapted to be supported on said first surface; a brake operating fluid pressure motor on the motor support disposed asymmetrically with respect to the plane of symmetry; means for securing the motor support to the first-mentioned support in either of two positions which are asymmetric with respect to the plane of symmetry; a conduit in the casing for fluid under pressure, said conduit terminating in said first-mentioned surface; and a pair of passages in the motor support, each connected at one end with the motor and each terminating at its other end in said second surface; and means for securing the motor support to the first support in either of two positions in each of which one of said passages register with said conduit and the other of said passages is closed by said first surface so that the motor can be supplied with pressure fluid in either of its positions on the first-mentioned support.

4. A power transmission comprising in combination a casing containing an input shaft, an output shaft, drive gearing connecting the shafts and a drive-establishing brake for the gearing, said brake being reversible with respect to said gearing to provide a self-energizing brake for either hand of rotation of the gearing and said casing having an opening surrounded by a support located symmetrically with respect to one plane of symmetry of the gearing and in a plane perpendicular to said plane of symmetry; a motor support having a surface adapted to be supported on said first support, a brake-operating fluid pressure motor on the motor support disposed asymmetrically with respect to the plane of symmetry; a conduit in the casing for fluid under pressure, said conduit terminating in a port in said support; and a pair of passages in the motor support each connected at one end with the motor, one of said passages terminating at its other end in said surface and in a position adapted to register with the conduit in the casing when the motor support is placed on the first support in one position, and the other of said passages terminating at its other end in a position to be closed by said first support when the motor support is placed on the first support in said one position; and means for supporting the motor support in either of two positions on said first support, each of which positions is asymmetrical with respect to the plane of symmetry for operating the brake in either of its two positions, said passages being so arranged that one passage is connected to the conduit and the other passage is closed when the motor support is in either of its two positions.

5. A device of the character described comprising in combination, a brake drum fixed to an element to be held, a brake band adapted to hold the drum against rotation and having an anchor end and an apply end, a brake shaft, the axis of which is disposed in a plane of symmetry of the drum, an anchor pivoted on the shaft and having a free end projecting on one side of said plane of symmetry and supporting the anchor end of the brake, a brake apply mechanism supporting the apply end of the brake and including a brake arm pivoted on the brake shaft and extending on the other side of said plane of symmetry, said anchor and brake apply mechanism being reversible on the shaft, and the brake band being reversible on the drum to provide a self-energizing brake for either hand of rotation of the drum means for operating the brake arm disposed asymmetrically with respect to said plane of symmetry, a support for said operating means symmetrical with respect to said plane of symmetry and means for holding the operating means in either of two asymmetrical positions on the symmetrical support to operate the brake as a self-energizing brake for either hand of rotation.

6. A device of the character described, comprising in combination a casing, a brake drum connected to an element in the casing, a brake band adapted to hold the drum against rotation, a shaft for supporting a brake actuating member, the axis of the shaft being in a plane of symmetry of the drum, a brake actuating member asymmetrically supported on the shaft, the brake band being reversible on the drum and the brake actuating member being reversible on the shaft to provide a self-energizing brake for either hand of rotation of the drum the casing having an opening surrounded by a support symmetrically arranged with respect to said plane of symmetry and substantially perpendicular thereto, a motor member asymmetrically mounted on said support, and means for holding the motor member in either of two asymmetrical positions on the symmetrical support to operate the brake as a self-energizing brake for either hand of rotation one of said members projecting through said opening into the path of the other member for operating said brake actuating member from the motor member.

7. A power transmission comprising in combination, a casing containing a brake and a brake drum and having an opening surrounded by a first supporting surface located symmetrically with respect to one plane of symmetry of the drum and substantially perpendicular to said plane of symmetry, said brake being reversible to provide a self-energizing brake for either hand of rotation of the drum, a motor support having a second surface adapted to be supported on said first surface, a brake operating fluid pressure motor on the motor support disposed asymmetrically with respect to the plane of symmetry, means for supporting the motor support on the first supporting surface in either of two positions in each of which the motor is asymmetric with respect to the plane of symmetry, a conduit in the casing for fluid under pressure, said conduit terminating in said first supporting surface, and a pair of passages in the motor support each connected at one end with the motor and each terminating at its other end in said second surface, the locations of said other ends being such that one of the passages registers with said conduit and the other passage is blocked by said first surface in either position of said motor support so that the motor can be supplied with fluid pressure by the conduit in either position.

References Cited in the file of this patent

UNITED STATES PATENTS

| | | |
|---|---|---|
| 1,320,906 | Ostolaga | Nov. 4, 1919 |
| 2,409,551 | Donnellan | Oct. 15, 1946 |
| 2,573,472 | Martin | Oct. 30, 1951 |
| 2,575,522 | McFarland | Nov. 20, 1951 |
| 2,701,630 | Horton et al. | Feb. 8, 1955 |
| 2,767,810 | Farkas et al. | Oct. 23, 1956 |
| 2,823,325 | Stephan | Feb. 11, 1958 |